D. M. JOHNSON.
Plow-Regulators.

No. 200,919. Patented March 5, 1878.

WITNESSES:
A. W. Almqvist
J. H. Scarborough

INVENTOR:
D. M. Johnson
BY
ATTORNEYS.

UNITED STATES PATENT OFFICE.

DANIEL M. JOHNSON, OF EMERSON, IOWA.

IMPROVEMENT IN PLOW-REGULATORS.

Specification forming part of Letters Patent No. 200,919, dated March 5, 1878; application filed July 30, 1877.

*To all whom it may concern:*

Figure 1:
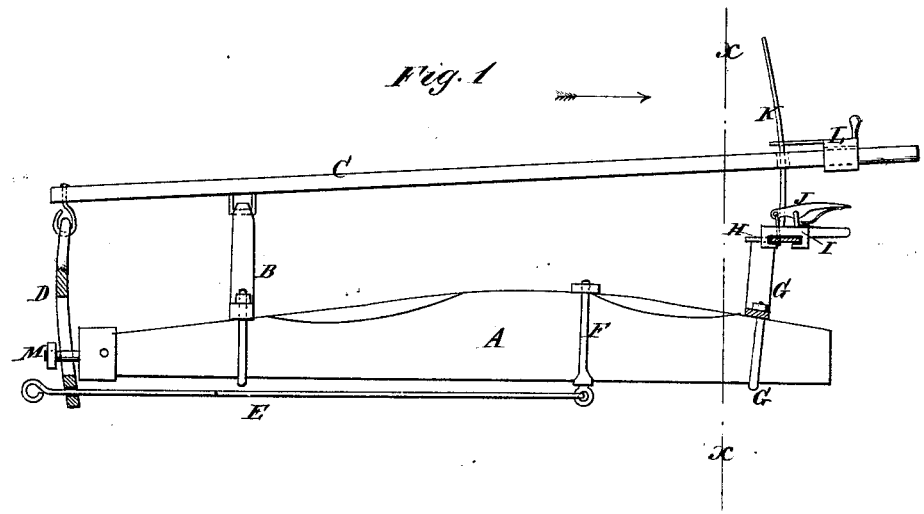
Figure 2:
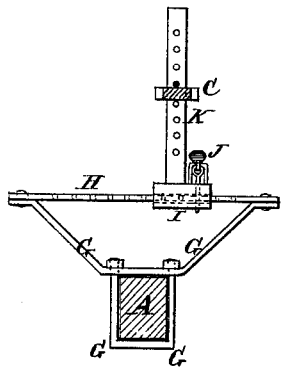

Be it known that I, DANIEL M. JOHNSON, of Emerson, in the county of Mills and State of Iowa, have invented a new and useful Improvement in Plow-Regulators, of which the following is a specification:

Figure 1 is a side view of my improved device, shown as applied to a plow-beam, and partly in section, to show the construction. Fig. 2 is a vertical cross-section of the same, taken through the line $x\ x$, Fig. 1.

Similar letters of reference indicate corresponding parts.

The object of this invention is to furnish an improved device for attachment to plow-beams to enable the plow to be adjusted to take and leave land, and to run deeper or shallower in the ground, without stopping the team, and which shall be simple in construction and convenient and reliable in use.

The invention consists in the combination of the clip, the perforated horizontal bar, the socket, the pin, lever, and spring, the perforated upright bar, and the pin and socket with the end of the lever, for holding the said lever in place, as hereinafter fully described.

A represents a plow-beam, to the upper side of which, near its forward end, is secured a short post, B, by a bow or other convenient clasp. To the upper end of the post B is pivoted a lever, C, the forward end of which is pivoted to the upper end of a bar, D. The bar D is slotted longitudinally to receive the bolt M, attached to the forward end of the beam A.

In the lower end of the bar D is formed a hole to receive the rod E, to the forward end of which the draft is applied, and the rear end of which is secured to the rear part of the plow-beam A by a clasp, F.

By this construction the plow may be adjusted to take and leave land by operating the lever C to bring the point of draft attachment to one or the other side of the plow-beam.

To the rear part of the beam A is attached a clip, G, the ends of the yoke of which are extended, are inclined upward, and to them is attached a bar, H, upon which slides a socket, I. The socket I is secured in place by a pin, which passes through a hole in the said socket I, and through one or another of the holes formed in the bar H. This pin is operated by a small lever, J, to which it is pivoted, and which is pivoted to the socket I, and is held in place, holding the said pin in place, by a small spring attached to it and bearing upon the said socket I.

To the socket I is attached the lower end of the bar K, which passes through a hole in the lever C, and has a number of holes formed through it to receive the pin L, attached to a socket, which slides upon the end of the lever C, so as to hold the said lever in place when adjusted.

By this construction the point of draft attachment is moved to one or the other side of the plow-beam, to cause the plow to take or leave land, by sliding the socket I upon the bar H, and is raised and lowered, to cause the plow to run deeper or shallower in the ground, by moving the lever C down or up upon the bar K.

Having thus described my invention, I claim as new and desire to secure by Letters Patent—

The combination of the clip G, the perforated bar H, the socket I, the pin, lever, and spring J, the perforated bar K, and the pin and socket L with the end of the lever C, for holding the said lever in place, substantially as herein shown and described.

Hastings, Iowa, June 11, 1877.

DANIEL M. JOHNSON.

Witnesses:
 GEO. W. BASSETT,
 T. S. GODDARD.